United States Patent
Zhang et al.

(10) Patent No.: US 11,907,128 B2
(45) Date of Patent: Feb. 20, 2024

(54) MANAGING DATA OF DIFFERENT CACHE TYPES WITHIN A STORAGE SYSTEM

(71) Applicant: EMC IP Holding Company LLC, Hopkinton, MA (US)

(72) Inventors: Ming Zhang, Beijing (CN); Chen Gong, Beijing (CN); Qiaosheng Zhou, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 18 days.

(21) Appl. No.: 17/740,780

(22) Filed: May 10, 2022

(65) Prior Publication Data
US 2023/0026418 A1    Jan. 26, 2023

(30) Foreign Application Priority Data
Jul. 20, 2021    (CN) .......................... 202110819445.2

(51) Int. Cl.
*G06F 12/08*     (2016.01)
*G06F 12/0871*   (2016.01)
*G06F 12/02*     (2006.01)
*G06F 12/0804*   (2016.01)
*G06F 12/0817*   (2016.01)

(52) U.S. Cl.
CPC ...... *G06F 12/0871* (2013.01); *G06F 12/0246* (2013.01); *G06F 12/082* (2013.01); *G06F 12/0804* (2013.01)

(58) Field of Classification Search
CPC ............ G06F 12/0871; G06F 12/0246; G06F 12/0804; G06F 12/082
See application file for complete search history.

(56) References Cited

U.S. PATENT DOCUMENTS

| | | | |
|---|---|---|---|
| 5,706,467 A * | 1/1998 | Vishlitzky | G06F 12/123 711/E12.072 |
| 9,317,436 B2 * | 4/2016 | Pan | G06F 12/0871 |
| 9,766,823 B2 | 9/2017 | Mylly | |
| 11,340,814 B1 | 5/2022 | Dalmatov et al. | |
| 2003/0221054 A1 | 11/2003 | Wu | |
| 2012/0137059 A1 | 5/2012 | Yang et al. | |
| 2013/0282984 A1 * | 10/2013 | Bi | G06F 12/0806 711/126 |
| 2015/0169237 A1 | 6/2015 | Ioannou et al. | |
| 2018/0032266 A1 * | 2/2018 | Yan | G06F 3/0647 |
| 2019/0004946 A1 * | 1/2019 | Li | G06F 12/0806 |
| 2019/0220190 A1 * | 7/2019 | He | G06F 3/0652 |
| 2021/0124689 A1 * | 4/2021 | Kucherov | G06F 12/0893 |
| 2022/0100677 A1 * | 3/2022 | Ofer | G06F 12/0238 |

* cited by examiner

*Primary Examiner* — Tasnima Matin
(74) *Attorney, Agent, or Firm* — BainwoodHuang

(57) ABSTRACT

A technique for managing a storage system involves determining, in response to a first write operation on a first data block on a persistent storage device, whether a first group of data corresponding to the first data block is included in a cache; updating the first group of data in the cache if it is determined that the first group of data is included in the cache; and adding the first group of data to an associated data set of the cache to serve as a first record. Accordingly, such a technique can associatively manage different types of cached data corresponding to a data block, thereby optimizing the system performance.

20 Claims, 12 Drawing Sheets

```
handler * UMCOpen (ulong64 path, ulong32 openType);
void UMCWrite (handler * hd, ulong32 offset, ulong32 len, void
* content);
void UMCClose (handler * hd);
void UMCOpenSG (pQHead & pathQHead, hQHead &
handlerQHead);
void UMCCloseSG (hQHead & handlerQHead);
```

FIG. 8

MANAGING DATA OF DIFFERENT CACHE TYPES WITHIN A STORAGE SYSTEM

CROSS-REFERENCE TO RELATED APPLICATION

This application claims priority to Chinese Patent Application No. CN202110819445.2, on file at the China National Intellectual Property Administration (CNIPA), having a filing date of Jul. 20, 2021, and having "METHOD, DEVICE AND COMPUTER PROGRAM PRODUCT FOR STORAGE SYSTEM MANAGEMENT" as a title, the contents and teachings of which are herein incorporated by reference in their entirety.

TECHNICAL FIELD

Embodiments of the present disclosure generally relate to the field of data storage, and in particular, to a method, a device, and a computer program product for managing a storage system.

BACKGROUND

A large amount of data is usually stored in a persistent storage device of a storage system. For example, the persistent storage device of the storage system usually stores a large amount of metadata, user data, and the like. The storage system usually uses a cache to process data stored in the persistent storage device. During use, the most frequently used data will be temporarily stored in the cache to avoid repeated creation, processing, and transmission of the data. By using the cache to process the most frequently used data, resources can be saved, and the performance of the system can be effectively improved. How to effectively manage the cache is a problem worthy of attention.

SUMMARY OF THE INVENTION

A method, a device, and a computer program product for managing a storage system are provided in embodiments of the present disclosure.

In a first aspect of the present disclosure, a method for managing a storage system is provided. The method includes determining, in response to a first write operation on a first data block on a persistent storage device, whether a first group of data corresponding to the first data block is included in a cache; updating the first group of data in the cache if it is determined that the first group of data is included in the cache; and adding the first group of data to an associated data set of the cache to serve as a first record.

In a second aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause the electronic device to perform actions including determining, in response to a first write operation on a first data block on a persistent storage device, whether a first group of data corresponding to the first data block is included in a cache; updating the first group of data in the cache if it is determined that the first group of data is included in the cache; and adding the first group of data to an associated data set of the cache to serve as a first record.

In a third aspect of the present disclosure, a computer program product is provided. The computer program product is tangibly stored in a non-transitory computer storage medium and includes machine-executable instructions. The machine-executable instructions, when executed by a device, cause the device to execute any step of the method according to the first aspect of the present disclosure.

The Summary of the Invention part is provided to introduce the selection of concepts in a simplified form, which will be further described in the Detailed Description below. The Summary of the Invention part is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in further detail with reference to the accompanying drawings, and in the example embodiments of the present disclosure, the same reference numerals generally represent the same components.

FIG. 8 shows an example API according to some embodiments of the present disclosure;

Identical or corresponding numerals represent identical or corresponding parts in various accompanying drawings.

DETAILED DESCRIPTION

Figure 1:
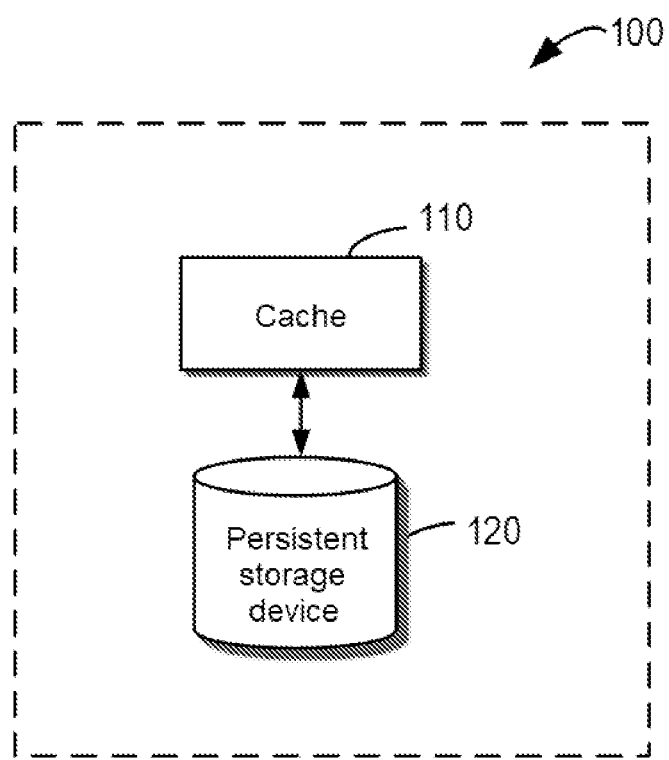
FIG. 1 shows a schematic diagram of an example system in which some embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Although preferred embodiments of the present disclosure are illustrated in the accompanying drawings, it should be understood that the present disclosure may be implemented in various forms and should not be limited by the embodiments illustrated herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "one example embodiment" and "one embodiment" mean "at least one example embodiment." The term "another embodiment" indicates "at least one additional embodiment." The terms "first," "second," and the like may refer to different or identical objects. Other explicit and implicit definitions may also be included below.

As described above, a persistent storage device of a storage system stores a large amount of metadata, user data, and the like. The storage system usually uses a cache to process data stored in the persistent storage device. During use, the most frequently used data will be temporarily stored in the cache to avoid repeated creation, processing, and transmission of the data. The cache includes different types of caches for various types of data (such as metadata).

In a conventional solution, different types of caches have different storage locations, such as storage layers, in the cache. However, such conventional solution lacks management for different types of caches. For example, various types of caches in the caches have their respective storage budgets, and it is difficult for a conventional solution to achieve an optimized balance between different types of caches. This causes a waste of cache resources, which in turn limits the performance of the system.

On the other hand, when performing operations on data, it is usually needed to access different cache types, that is, access different cache layers. For data on which operations are to be performed, there are scenarios where certain cache types of cached data can be found in corresponding cache layers, while some other cache types of cached data cannot be found in corresponding cache layers. In this case, it is necessary to wait for the cache to prepare all corresponding cached data before completing the operations on the data. Therefore, such conventional solution increases the time for waiting data operations and affects the performance of the system.

Embodiments of the present disclosure propose a solution for managing a storage system to solve one or more of the above problems and other potential problems. In this solution, a group of data in a cache and corresponding to one data operation on a data block (or data) of a persistent storage device is added to an associated data set in the cache as a record. In this way, a group of cached data of different cache types corresponding to one data operation on the data on the persistent storage device can be added as one record to the associated data set. In this way, the group of cached data of different cache types can be associatively managed according to the record in the associated data set. In this way, the utilization rate of the cache can be mentioned, and the data processing performance of the storage system can be improved.

The embodiments of the present disclosure will be described in detail below with reference to the accompanying drawings.

FIG. 1 shows a schematic diagram of storage system 100 in which an embodiment of the present disclosure may be implemented. Storage system 100 is used to provide a data storage-related task, including, for example, storage, data access, and data protection (such as deduplication, backup, encryption, and decryption). It should be understood that the system illustrated in FIG. 1 is only an example.

As shown in FIG. 1, storage system 100 includes cache 110 and persistent storage device 120. It should be understood that although only one cache 110 and one persistent storage device 120 are shown in FIG. 1, this is only illustrative, and storage system 100 may include any number of caches 110 and any number of persistent storage devices 120.

A large amount of data, such as metadata, is stored in persistent storage device 120. When a user's client terminal accesses (for example, reads or writes) data (or a data block) in persistent storage device 120, it will access cache 110 to obtain the data (or the data block). A group of cached data in cache 110 and corresponding to data (or a data block) on which operations are to be performed in persistent storage device 120 may belong to different cached data types. Common types of cached data include but are not limited to: data block index IB, data block check BMD, usage status CG, and the like.

When the data in persistent storage device 120 needs to be changed, storage system 100 will maintain the consistency of data in cache 110 and the data in persistent storage device 120 through atomic operations (also referred to as operations or transactions).

Figure 2:
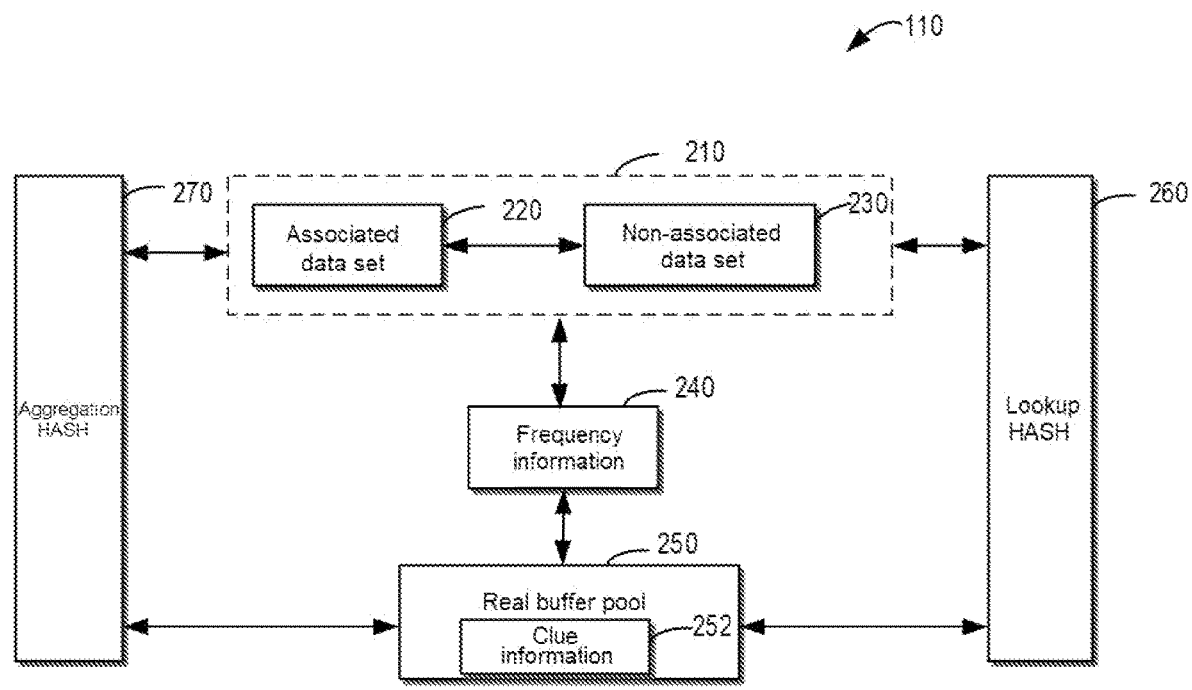
FIG. 2 shows a schematic diagram of an example architecture of a cache according to some embodiments of the present disclosure.

FIG. 2 shows an example architectural diagram of cache 110 according to some embodiments of the present disclosure. As shown in FIG. 2, cache 110 includes data set 210, and data set 210 may be a data set using a least recently used (LRU) algorithm. Data set 210 includes associated data set 220 and non-associated data set 230. Associated data set 220 and non-associated data set 230 may include various types of cached data as described above.

Each piece of data in associated data set 220 and non-associated data set 230 is associated with frequency information 240. Frequency information 240 includes frequency information associated with each piece of data. The frequency information can be determined, for example, based on a record of data accesses in the latest period of time. Frequency information 240 will be described in more detail below with reference to FIG. 5.

Real cache pool 250 is also shown in FIG. 2. Each piece of data and information such as frequency information 240 in associated data set 220 and non-associated data set 230 are actually stored in corresponding physical addresses in real cache pool 250. Real cache pool 250 includes clue information 252 for different data. Clue information 252 may include various types of information which can identify data, such as FSID, FSBN, and offset. Clue information 252 of real cache pool 250 will be described in more detail below with reference to FIG. 6.

FIG. 2 also shows lookup HASH (hash) 260 and aggregation HASH 270. As shown in FIG. 2, both lookup HASH 260 and aggregation HASH 270 are associated with real cache pool 250. Each piece of data in associated data set 220 and non-associated data set 230 is associated with lookup HASH 260. Corresponding data in associated data set 220 and non-associated data set 230 can be found through lookup HASH 260 by using a HASH algorithm based on information such as FSID, FSBN, and offset that can identify data. Each piece of data in associated data set 220 and non-associated data set 230 is associated with aggregation HASH 270. Aggregation HASH 270 will be described in more detail below with reference to FIG. 7.

It should be understood that the example architecture of cache 110 shown in FIG. 2 is only illustrative. In some embodiments, cache 110 may have a different architecture, and may include more or fewer components.

Figure 3:
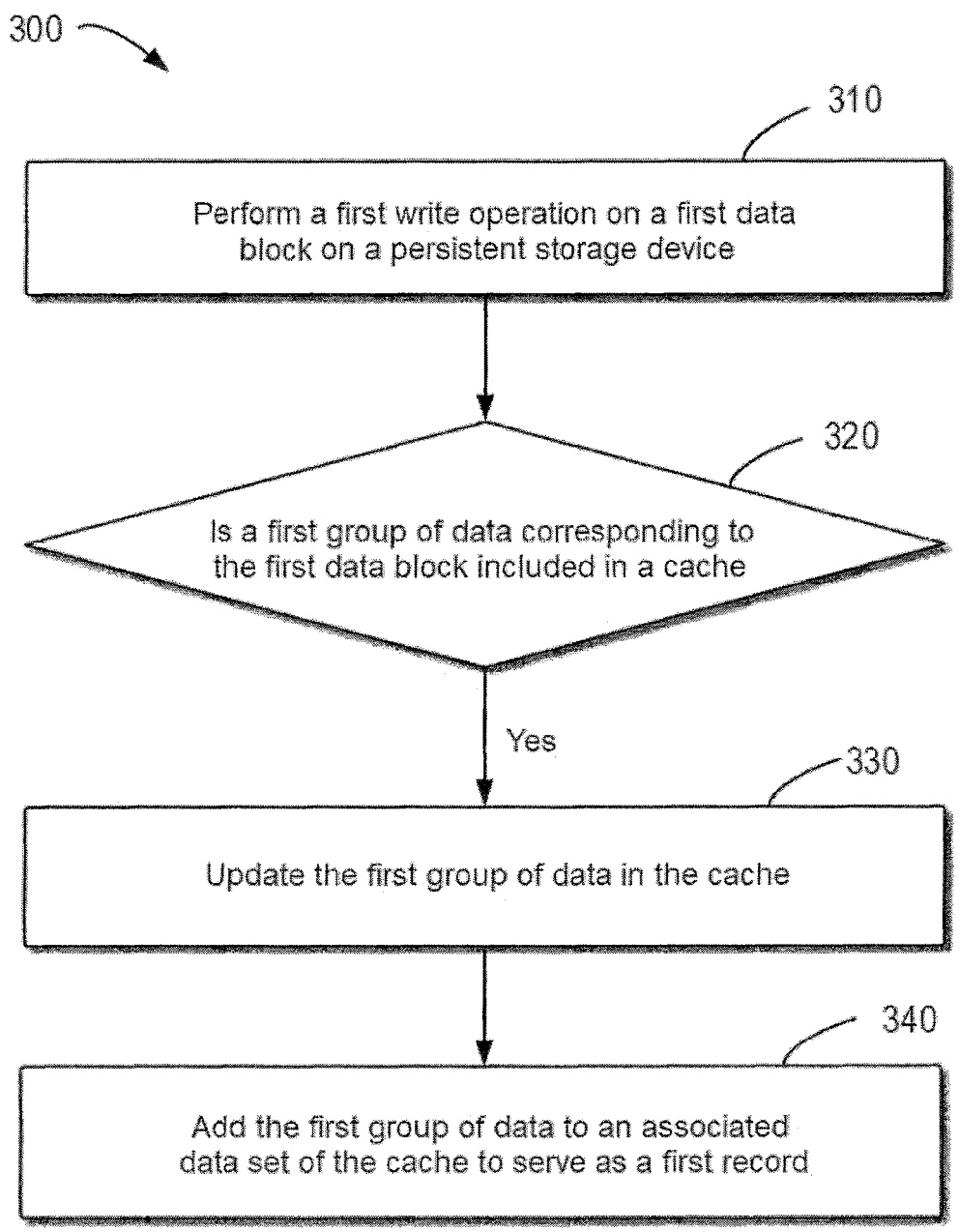
FIG. 3 shows a schematic diagram of an example method for managing a storage system according to some embodiments of the present disclosure.

FIG. 3 shows a flow chart of example method 300 for managing storage system 100 according to some embodiments of the present disclosure. Method 300 may be, for example, performed by storage system 100 as shown in FIG. 1. It should be understood that method 300 may also be performed by other suitable devices or apparatuses. Method 300 may include additional actions not shown and/or may omit actions shown, and the scope of the present disclosure is not limited in this regard. Method 300 will be described in detail below with reference to FIG. 1 and FIG. 2.

As shown in FIG. 3, at 310, a first write operation is performed on a first data block on persistent storage device 120. For example, a first write operation may be performed on a first data block (or data) on persistent storage device 120 to modify the first data block.

At 320, it is determined whether a first group of data corresponding to the first data block is included in cache 110. For example, lookup HASH 260 may be used to look up whether the first group of data is included in real cache pool 250 of cache 110 based on information such as FSID, FSBN, or offset of the first data block. The first group of data may include various types of cached data, for example, including one or more of IB, BMD, CG, and other types of cached data.

In some embodiments, if it is determined at 320 that the first group of data corresponding to the first data block is not included in cache 110, the first group of data is added to non-associated data set 230 in cache 110. Each piece of data in non-associated data set 230 is stored independently. In some embodiments, the data in non-associated data set 230 and the data in each record in associated data set 220 do not overlap with each other. In some embodiments, non-associated data set 230 may be a non-associated data queue. The pieces of data in the first group of data can be sequentially added to a tail of the non-associated data queue. It should be understood that non-associated data set 230 may also use another type of data structure, such as a list and a stack.

If it is determined at 320 that the first group of data corresponding to the first data block is included in cache 110, method 300 proceeds to 330. At 330, the first group of data in the cache is updated. For example, the first group of data in cache 110 is updated respectively to ensure data consistency in cache 110.

At 340, the first group of data is added as a first record in associated data set 220 of cache 110. It should be understood that step 330 and step 340 shown in FIG. 3 may be performed in parallel or performed sequentially in any order.

In some embodiments, associated data set 220 may be an associated data queue. The first group of data can be added as a first record to a tail of the associated data queue. Additionally and alternatively, each record in associated data set 220 may also be a record queue. It should be understood that associated data set 220 and the records may also use another type of data structure, such as a list and a stack.

In some embodiments, storage system 100 may also determine whether first data in the first data group is included in existing data in associated data set 220. The data in the existing data in associated data set 220 is updated in cache 110 in response to a second write operation on a second data block on persistent storage device 120. The second write operation is any write operation that occurs before the first write operation. If it is determined that the first data is included in the existing data, the first data may be removed from the existing data.

Additionally or alternatively, in some embodiments, storage system 100 may also determine whether the first data in the first group of data is included in non-associated data set 230. If it is determined that the first data is included in non-associated data set 230, the first data may be removed from non-associated data set 230.

Figure 4:
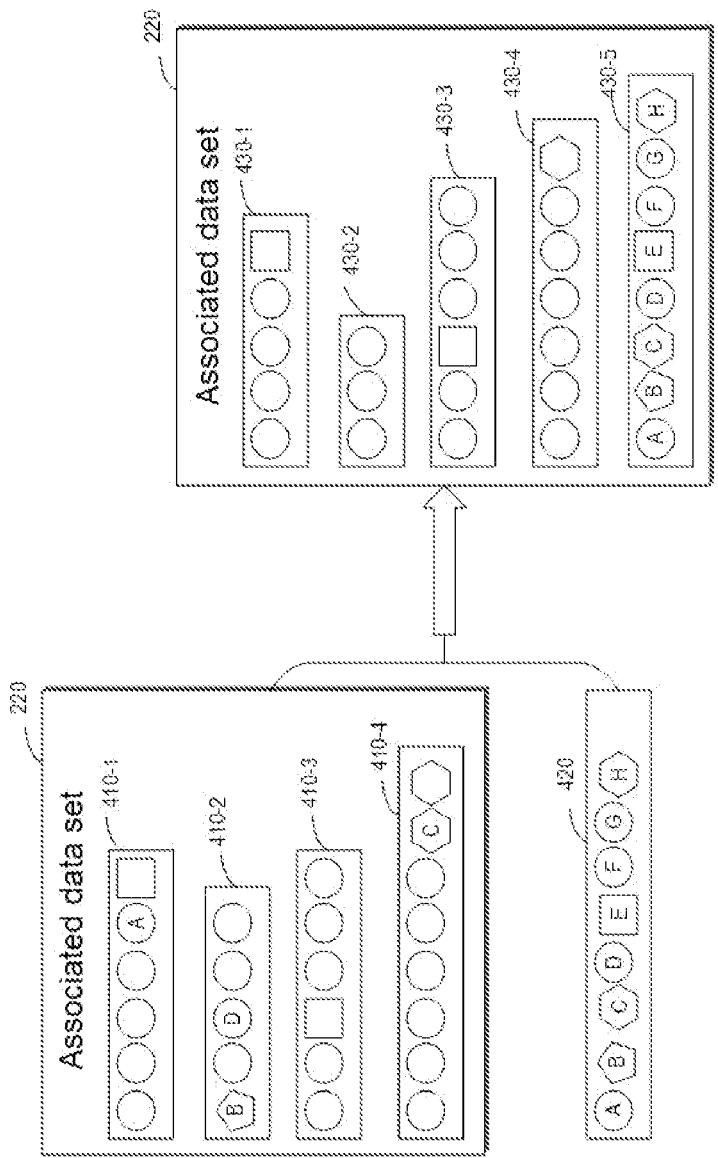
FIG. 4 shows an example of updating associated data set 220 according to some embodiments of the present disclosure.

FIG. 4 shows an example of adding a first group of data to associated data set 220 to serve as a first record. As shown in FIG. 4, associated data set 220 originally includes records 410-1, 420-2, 410-3, and 410-4. It should be understood that different shapes are used in FIG. 4 to represent different types of cached data. For example, circles, squares, pentagons, and hexagons can represent IB, BMD, CG, and other cached data, respectively. It should be understood that the above different shapes can also be used to represent other types of cached data. As shown in FIG. 4, record 410-1 includes 6 pieces of data, the others including data A; record 410-2 includes 5 pieces of data, the others including data B and D; record 410-3 includes 6 pieces of data; and record 410-4 includes 8 pieces of data, the others including data C. As shown in the drawing, each record in associated data set 220 may include a different number of various types of cached data.

When first group of data 420 is added to associated data set 220, resulting associated data set 220 may include records 430-1, 430-2, 430-3, 430-4, and 430-5. First group of data 420 may include different types of data A, B, C, D, E, F, G, and H. First group of data 420 may be added to associated data set 220 as new record 430-5. As shown in FIG. 4, after first group of data 420 is added to associated data set 220, data A, B, C, and D in original records 410-1, 410-2, 410-3, and 410-4 that are included in new record 430-5 are removed respectively.

It should be understood that although non-associated data set 230 is not shown in FIG. 4, one or more of data E, F, G, and H in first group of data 420 that are not included in original records 410-1, 410-2, 410-3, and 410-4 may be included in non-associated data set 230. If, for example, data E is included in non-associated data set 230, data E will be removed from non-associated data set 230.

In the above manner, a group of data in cache 110 and corresponding to one write operation on the data on persistent storage device 120 can be associatively added to associated data set 220. In this way, a group of data having an association relationship can be uniformly associated in cache 110, thereby increasing a hit rate for buffered data when performing data operations. In this way, waste of resources can be avoided, and the performance of the system in data processing can be improved.

In some embodiments, if the cache space of associated data set 220 is insufficient, a second record in associated data set 220 may be removed. The second record is the earliest added data record in associated data set 220. For example, if associated data set 220 is an associated data queue, the second record is the record at the beginning of the associated data queue. Additionally, after the second record in associated data set 220 is removed, each piece of data in the second record may be added to non-associated data set 230.

Additionally or alternatively, in some embodiments, if it is determined that the number of pieces of data that are accessed in a recent period of time among various pieces of data in the second record does not exceed a threshold number, the second record is removed from associated data set 220. Otherwise, the second record is retained in associated data set 220. Additionally, if the second record is retained in associated data set 220, the data record that was added the second earliest in associated data set 220 may be removed.

In some embodiments, frequency information 240 may be used to determine whether the number of pieces of data that have been accessed in a recent period of time among various pieces of data in the second record exceeds a threshold number. For example, frequency information 240 may record the number of times that each piece of data has been accessed, e.g., written or read, within a recent period of time (for example, 1 minute or another time length). In some embodiments, frequency information 240 may be as shown in FIG. 5.

Figure 5:
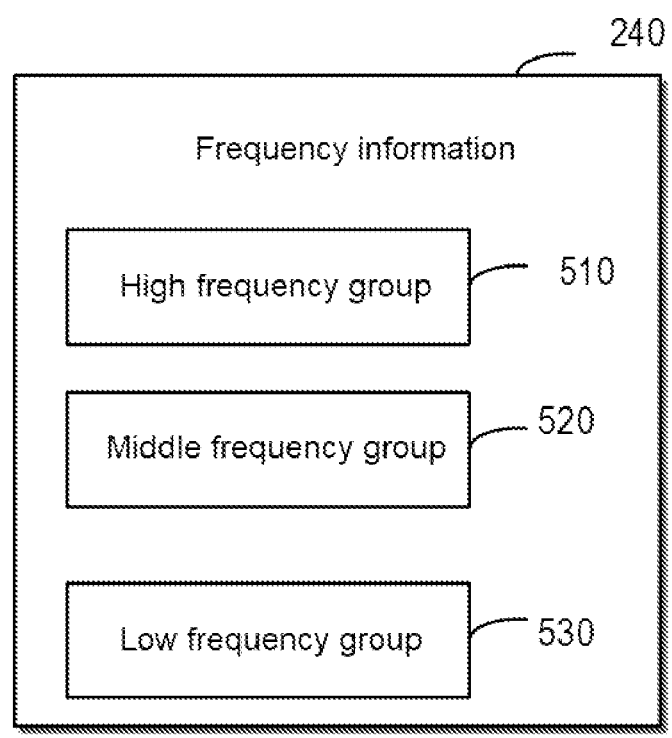
FIG. 5 shows an example of frequency information according to some embodiments of the present disclosure.

As shown in FIG. 5, frequency information 240 may include high frequency group 510, middle frequency group 520, and low frequency group 530. High frequency group 510, middle frequency group 520, and low frequency group 530 are respectively determined according to the number of times that each piece of data has been accessed in a recent period of time compared with a first threshold number and a second threshold number. If the number of times that the data has been accessed in a recent period of time is higher than both the first threshold number and the second threshold number, it belongs to high frequency group 510. If the number of times that the data has been accessed in a recent period of time is lower than both the first threshold number and the second threshold number, it belongs to low frequency group 510. If the number of times that the data has been accessed in a recent period of time is higher than the first threshold number and lower than the second threshold number (the second threshold number is higher than the first threshold number), it belongs to middle frequency group 510. The threshold number, the first threshold number, and the second threshold number mentioned above may be any appropriate numbers.

Using frequency information 240 shown in FIG. 5, the data belonging to low frequency group 530 may be determined as that the number of accesses in a recent period of time does not exceed the threshold number. Alternatively, the data belonging to low frequency group 530 and medium frequency group 520 may also be determined as that the number of accesses in a recent period of time does not exceed the threshold number.

In this way, it can be ensured that data that has been frequently accessed (e.g., read) in a recent period of time will not be removed from associated data set 220. Further, it can be ensured that the data that has been frequently operated recently can be retained in associated data set 220 for subsequent operations.

In some embodiments, the data in the second record may be divided into at least one data group based on address indexes of the pieces of data in the second record in cache 110. Address indexes of data belonging to the same data group are close to each other. The address indexes of the data in cache 110 may be stored in clue information 252 in real cache pool 250.

Figure 6:
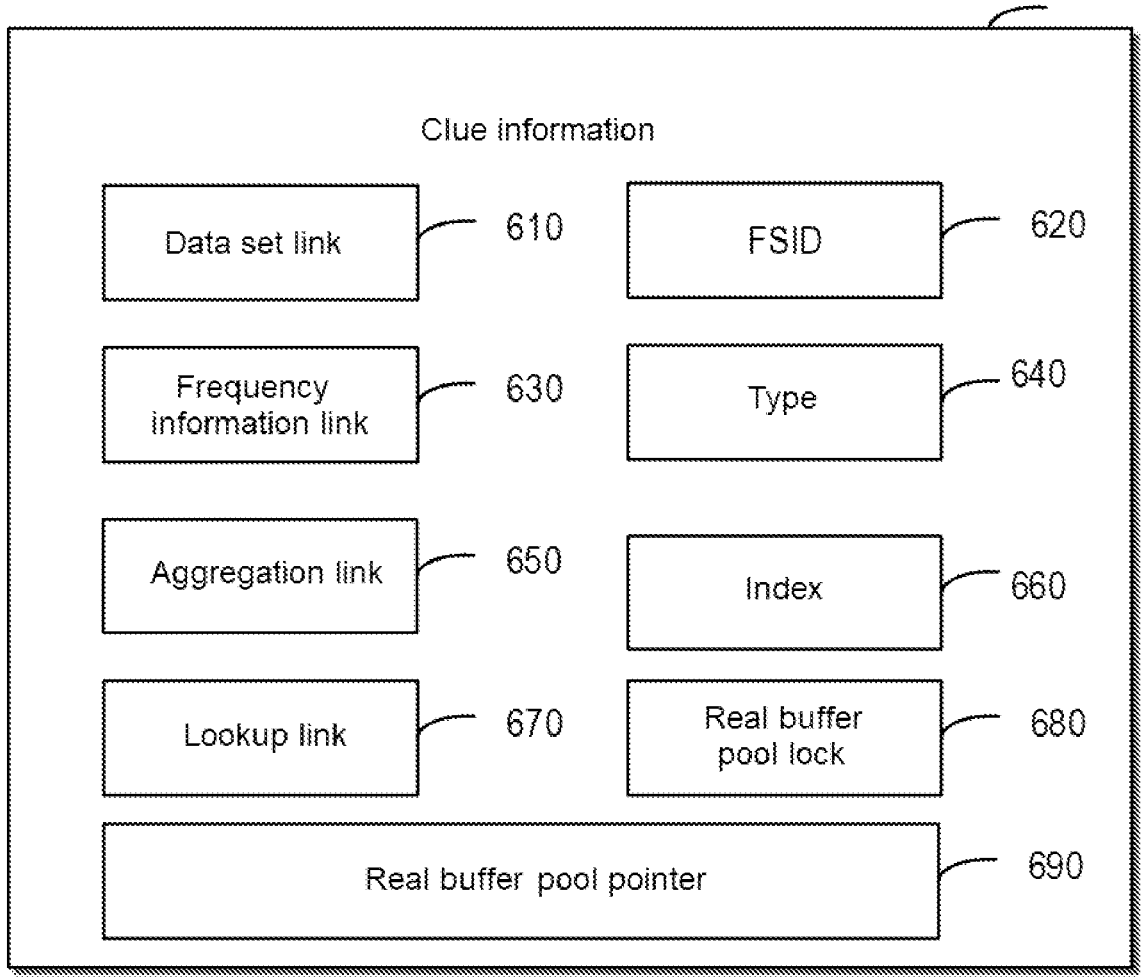
FIG. 6 shows an example of clue information according to some embodiments of the present disclosure.

FIG. 6 shows example clue information 252 in real cache pool 250 according to some embodiments of the present disclosure. As shown in FIG. 6, clue information 252 for data includes data set link 610 that maps data to one of associated data set 220 and non-associated data set 230. Clue information 252 also includes FSID 620 which may be an identifier of data. Clue information 252 also includes frequency information link 620 which maps data to a group in frequency information 240, such as high frequency group 510. Clue information 252 also includes type 640 which indicates the type of data, such as IB, BMD, or CG. Clue information 252 also includes aggregation link 650 which maps data to aggregation HASH 270. Clue information 252 also includes index 660 which records index information of data. Clue information 252 also includes lookup link 670 which maps data to lookup HASH 260. Clue information 252 also includes real buffer pool lock (BUF RWLOCK) 680 which is used to indicate a lock for data. Clue information 252 also includes real cache pool pointer 690 which is used to locate data to a physical location in real cache pool 250.

In some embodiments, the data in the second record may be divided into at least one data group based on, for example, index 680 of each piece of data in the second record that is mapped to clue information 252 of the data.

Figure 7:
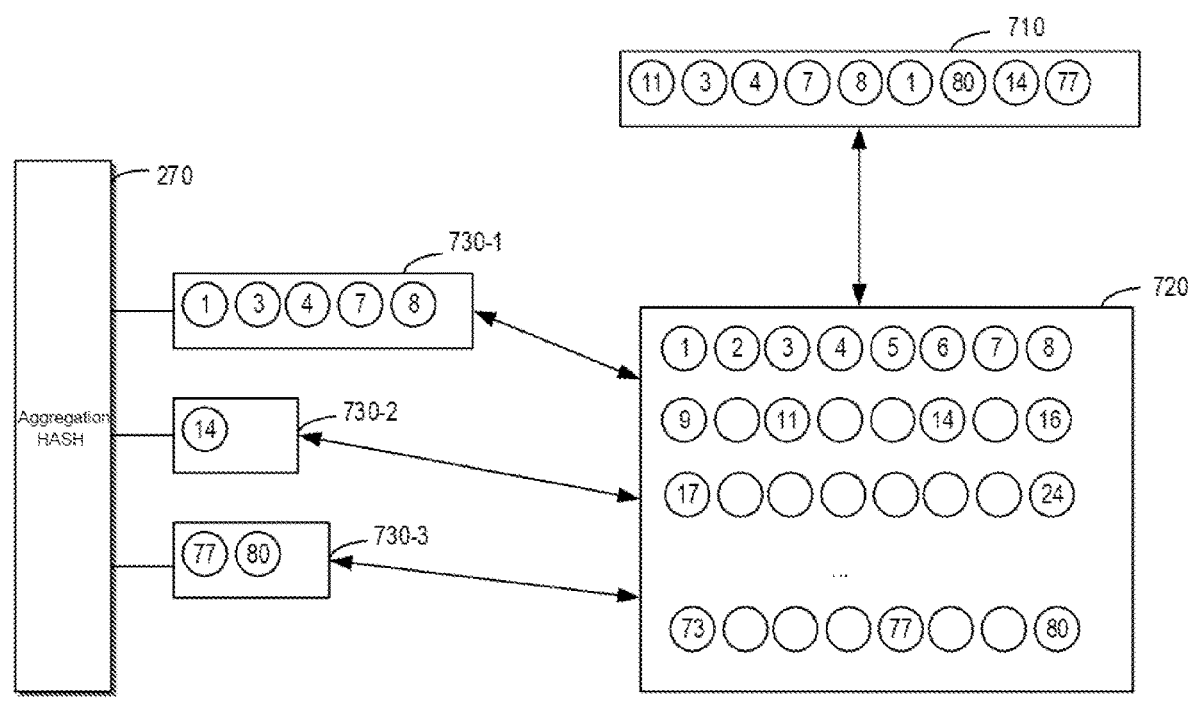
FIG. 7 shows an example of grouping data in a record according to some embodiments of the present disclosure.

FIG. 7 describes a process of dividing the data of the second record with reference to aggregation HASH 270. As shown in FIG. 7, second record 710 to be removed includes a group of data with address indexes, for example, data with HASH index values being 11, 3, 4, 7, 8, 1, 80, 14, and 77. Each piece of data in second record 710 may be stored in real cache pool 250 according to the HASH index, as shown in 720. In some embodiments, each piece of data in second record 710 may be grouped by a value obtained by shifting a HASH index to the right by three bits in binary. For example, as shown in FIG. 7, in aggregation HASH 270, data with HASH indexes 1, 3, 4, 7, and 8 are aggregated into group 730-1, data with HASH index 14 are aggregated into group 730-2, and data with HASH indexes 77 and 80 are aggregated into group 730-3. It should be understood that group 730-1, group 730-2, and group 730-3 of second record 710 shown in FIG. 7 are only illustrative, and other grouping methods may also be used to group second record 710.

In some embodiments, after second record 710 is grouped, data in second record 710 and belonging to the same data group may be removed from second record 710 in the same removal operation. For example, the data in group 730-1 may be removed from second record 710 in one removal operation. Additionally or alternatively, in some embodiments, data in second record 710 and belonging to the same data group may also be added to non-associated data set 230 in the same adding operation.

In this way, a group of data in cache 110 having similar addresses in real buffer pool 250 can be processed in one removal operation and/or adding operation. In this way, the number of data operations can be reduced, resources can be saved, and therefore, the data processing performance of the storage system can be improved. Such operations can be more friendly to lower-level buffering.

Figure 9:
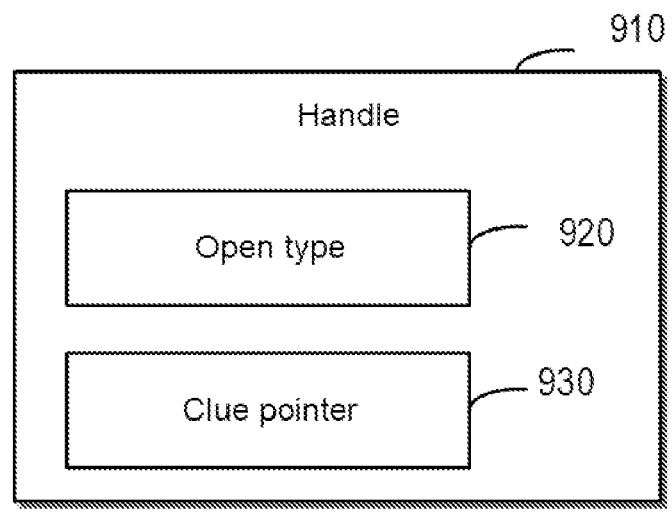
FIG. 9 shows an example handle according to some embodiments of the present disclosure.

FIG. 8 shows application program interface (API) 800 of operation buffer 110 according to some embodiments of the present disclosure. As shown in FIG. 8, API 800 may include a UMCOpen function, which returns a handle pointer. FIG. 9 shows example handle 910 according to some embodiments of the present disclosure. As shown in FIG. 9, handle 910 includes open type 920 and clue pointer 930. Open type 920 may include a read type ("Read") and a write type ("Write"). Clue pointer 930 may point to clue information 252 in real buffer pool 250. As shown in FIG. 9, the UMCOpen function needs input of an address and an open type, wherein the address may be a combination of FSID 620, type 640, and index 660.

FIG. 9 also shows a UMCWrite function, which provides change content and a scope of a change to be performed by API 900. FIG. 9 also shows a UMCClose function, which will be called when a user completes data change. If the open type is "Write", a program will put the changed data into associated data set 220.

FIG. 9 also shows a UMCOpenSG function, which traverses an input address Q, opens each required buffer, and adds each handle to handlerQHead. The hQHead in FIG. 9 may include an index-associated data queue Ref SG, and the index-associated data queue Ref SG may be updated every time new data is found. An execution process of the UMCOpenSG function will be described in more detail with reference to FIG. 10.

FIG. 9 also shows a UMCCloseSG function, which traverses a handle queue and closes each handle. In this process, clue information 252 will be established as a record. The record will be added to a tail of associated data set 220 (being the associated data queue in this example). An execution process of the UMCOpenSG function will be described in more detail with reference to FIG. 11.

Figure 10:
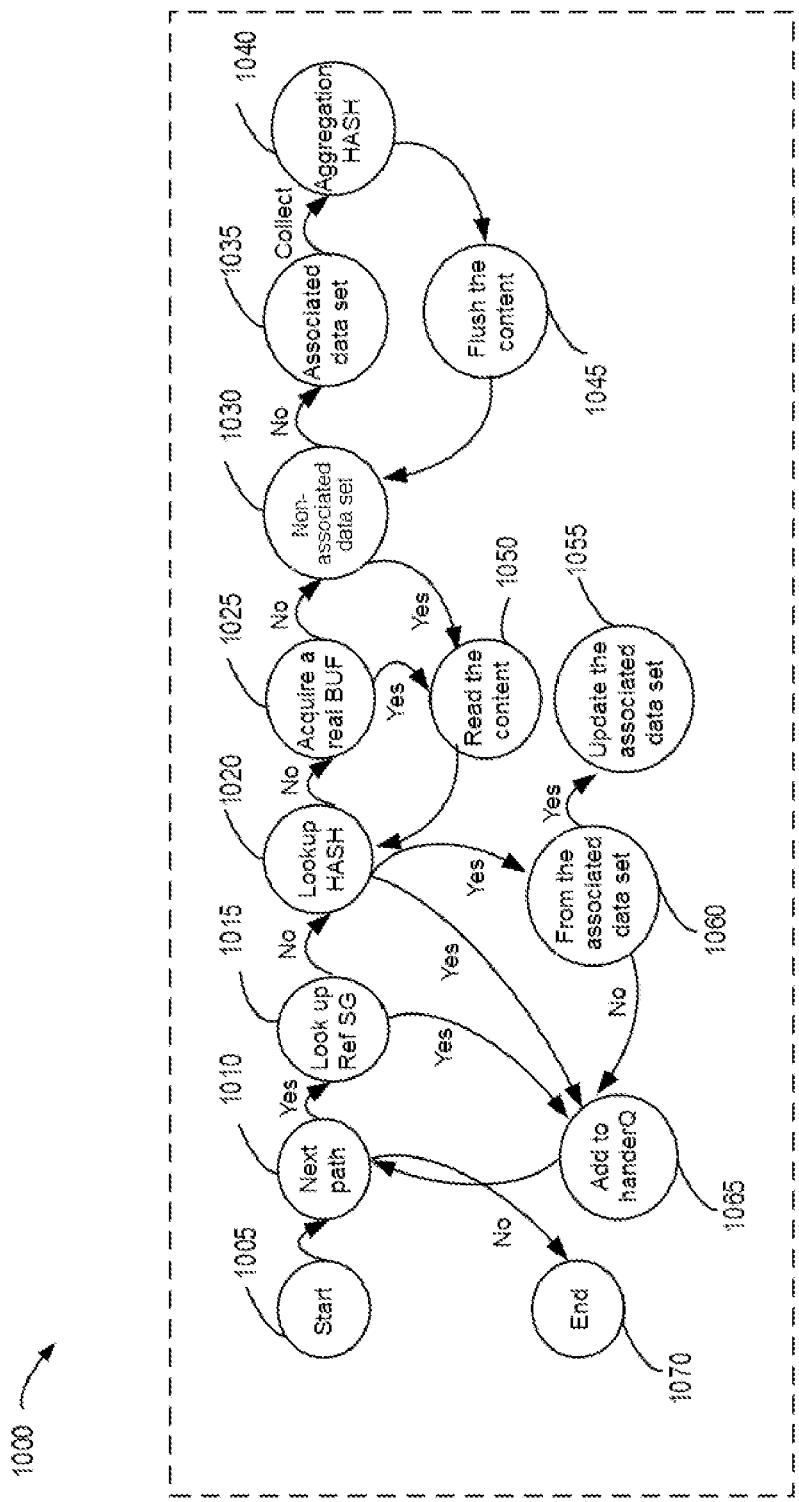
FIG. 10 shows an example process of a UMCOpenSG function according to some embodiments of the present disclosure.

FIG. 10 shows example process 1000 of a UMCOpenSG function according to some embodiments of the present disclosure. As shown in FIG. 10, the UMCOpenSG function starts at 1005. At 1010, it is determined whether there is a next path. For example, the initial path is determined by an input parameter pathQHead in the function UMCOpenSG in FIG. 8, and then it is determined whether there is a next path every time. If it is determined at 1010 that there is no next path, the process proceeds to 1070 and ends.

If it is determined at 1010 that there is a next path, the process proceeds to 1015. At 1015, a Ref SG queue is looked up to determine whether data at the path has been stored in the Ref SG in the previous process. If it is determined at 1015 that the data has been included in the Ref SG queue, the process proceeds to 1065. At 1065, data corresponding to the path is added to a handerQ. Next, the process returns to 1010 to look up the next path.

If it is determined at 1015 that the data is not included in the Ref SG queue, the process proceeds to 1020. At 1020, lookup HASH 260 is looked up for the data. If it is found at 1020 that the data is included in associated data set 220, the process proceeds to 1060 and 1065. At 1060, it is determined whether the data comes from existing data in associated data set 220.

If it is determined at 1060 that the data comes from existing data in associated data set 220, the data is removed from associated data set 220, and the process proceeds to 1055. At 1055, the removed data is added to a new record of associated data set 1055 to update the associated data set. If it is determined at 1060 that the data does not come from associated data set 220, the process proceeds to 1065. At 1065, data corresponding to the path is added to a handerQ. Next, the process returns to 1010 to look up the next path.

If the data is not found in associated data set 220 at 1015, the process proceeds to 1025. At 1025, it is determined whether real buffer pool 250 can be obtained. If it is determined at 1025 that real buffer pool 250 can be obtained, the content is read, and the content is added to lookup HASH 260. If it is determined at 1025 that real buffer pool 250 cannot be obtained, the process proceeds to 1030. At 1030, it is determined whether the data can be obtained from non-associated data 230.

If it is determined at 1030 that the data can be obtained, the process proceeds to 1050. At 1050, the content is read. Next, the data is added to lookup HASH 260. If it is determined at 1030 that the data cannot be acquired, the process proceeds to 1035. At 1035, the second record at the beginning of associated data set 220 (for example, associated data queue) is flushed from associated data set 220. In some embodiments, the second record to be flushed from associated data set 220 may also be determined based on frequency information 240. At 1040, the data of the second record are collected into aggregation HASH 270, and the data of the second record are grouped by aggregation HASH 270 according to indexes.

At 1045, according to the groups determined by aggregation HASH 270, the content of the data of the second record is flushed according to the groups. Next, the data that is flushed at 1045 is added to non-associated data set 230, and the process returns to 1030.

Figure 11:
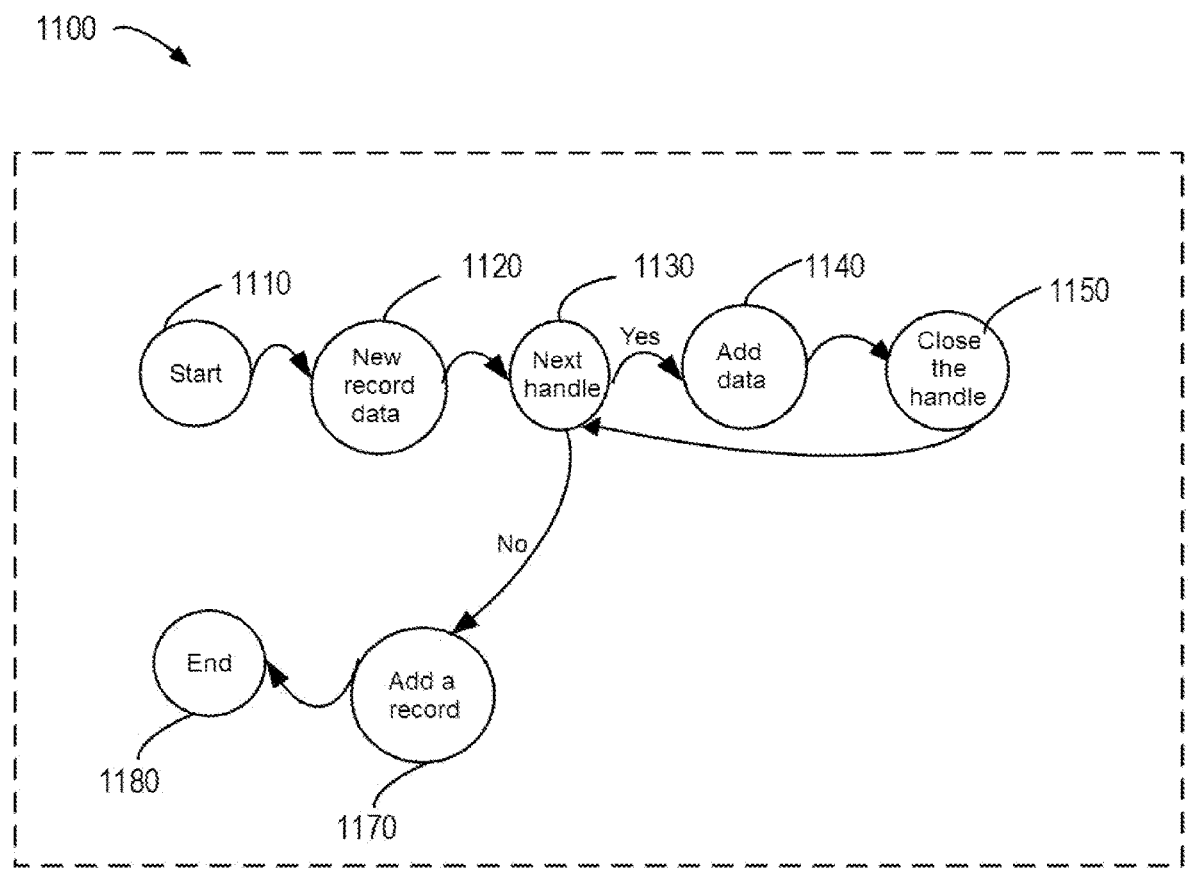
FIG. 11 shows an example process of a UMCCloseSG function according to some embodiments of the present disclosure.

FIG. 11 shows example process 1100 of a UMCCloseSG function according to some embodiments of the present disclosure. The UMCCloseSG function starts at 1110. At 1120, new record data at the current handle is determined. For example, the current handle may be a handle indicated by an input parameter handlerQHead of the function, or may be a next handle determined in the previous execution. At 1130, it is determined whether there is a next handle.

If it is determined at 1130 that there is no next handle, the process proceeds to 1170. At 1170, a new record is added to associated data set 220. The new record may be obtained during the previous execution of the UMCCloseSG function. For example, the new record may be added to a tail of associated data set 220 (for example, the associated data queue).

If it is determined at 1130 that there is a next handle, the process proceeds to 1140. At 1140, data is added to the determined new record. For example, the data may be added to a tail of a four-year record (for example, a record queue). At 1150, the current handle is closed, and the process returns to 1130 to determine whether there is a next handle.

The process of executing an example API function for managing buffer 110 according to some embodiments of the present disclosure is described above with reference to FIG. 10 and FIG. 11. By performing these processes, a group of associated data can be associated together to improve the hit rate for buffered data when performing data operations. In this way, resources can be saved, and therefore, the performance of the storage system can be improved.

Figure 12:
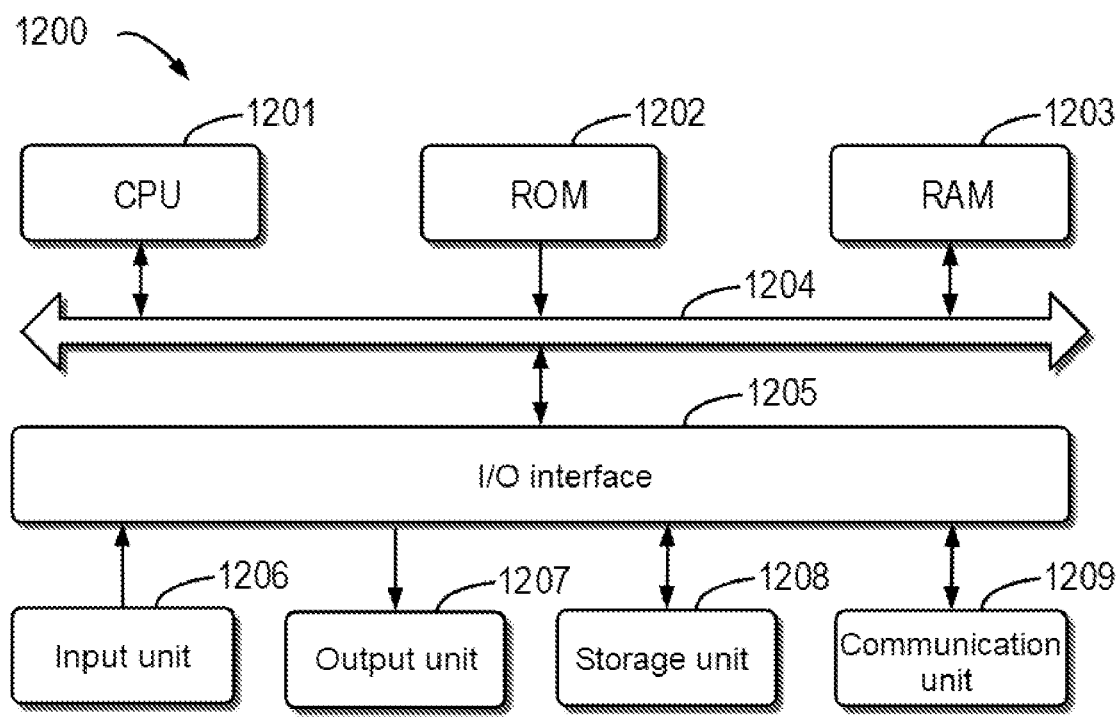
FIG. 12 is a schematic block diagram of an example device that may be used to implement an embodiment of the present disclosure.

FIG. 12 is a schematic block diagram of example device 1200 that may be used to implement an embodiment of the present disclosure. For example, storage system 100 as shown in FIG. 1 may be implemented by device 1200. As shown in FIG. 12, device 1200 includes central processing unit (CPU) 1201 that may perform various appropriate actions and processing according to computer program instructions stored in read-only memory (ROM) 1202 or computer program instructions loaded from storage unit 1208 into random access memory (RAM) 1203. In RAM 1203, various programs and data required for operations of device 1200 may also be stored. CPU 1201, ROM 1202, and RAM 1203 are connected to each other through bus 1204. Input/output (I/O) interface 1205 is also connected to bus 1204.

A plurality of components in device 1200 are connected to I/O interface 1205, including: input unit 1206, such as a keyboard and a mouse; output unit 1207, such as various types of displays and speakers; storage unit 1208, such as a magnetic disk and an optical disc; and communication unit 1209, such as a network card, a modem, and a wireless communication transceiver. Communication unit 1209 allows device 1200 to exchange information/data with other devices over a computer network such as the Internet and/or various telecommunication networks.

The various processes and processing described above, such as method 300, process 1000, or process 1100, may be performed by processing unit 1201. For example, in some embodiments, method 300, process 1000, or process 1100 may be implemented as a computer software program, which is tangibly included in a machine-readable medium, such as storage unit 1208. In some embodiments, part or all of the computer program may be loaded and/or installed onto device 1200 via ROM 1202 and/or communication unit 1209. When the computer program is loaded into RAM 1203 and executed by CPU 1201, one or more actions of method 300, process 1000, or process 1100 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming language such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or implemented using a combination of special hardware and computer instructions.

The embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

The invention claimed is:

1. A method for managing a storage system, comprising:
    determining, in response to a first write operation on a first data block on a persistent storage device, whether a first group of data corresponding to the first data block is in a cache;
    updating the first group of data in the cache if it is determined that the first group of data is in the cache;
    adding the first group of data to an associated data set of the cache to serve as a first record;
    removing a second record in the associated data set in response to insufficient cache space in the associated data set, wherein the second record is the earliest added data record in the associated data set; and
    adding each piece of data comprised in the second record to the non-associated data set of the cache; and
    dividing data in the second record into at least one data group based on address indexes of the pieces of data in the second record in the cache, wherein address indexes of the data belonging to the same data group are close to each other,
    wherein removing the second record comprises: removing data in the second record that belong to the same data group from the second record in the same removal operation; and
    wherein adding each piece of data comprised in the second record to the non-associated data set comprises: adding data in the second record that belong to the same data group to the non-associated data set in the same adding operation.

2. The method according to claim 1, further comprising:
    determining whether first data in the first group of data is comprised in existing data in the associated data set, wherein the existing data is updated in the cache in response to a second write operation on a second data block on the persistent storage device, and the second write operation occurs before the first write operation; and
    removing the first data from the existing data if it is determined that the first data is comprised in the existing data.

3. The method according to claim 1, further comprising:
    adding the first group of data to a non-associated data set in the cache if it is determined that the first group of data is not comprised in the cache, wherein data in the non-associated data set does not overlap with data in each record in the associated data set.

4. The method according to claim 3, further comprising:
    determining whether first data in the first group of data is comprised in the non-associated data set; and
    if it is determined that the first data is comprised in the non-associated data set:
    removing the first data from the non-associated data set.

5. The method according to claim 1, wherein removing the second record further comprises:
    removing the second record if it is determined that the number of accesses to each piece of data in the second record in a recent period of time does not exceed a threshold number.

6. The method according to claim 1, wherein the associated data set is an associated data queue, and
    wherein adding the first group of data to the associated data set to serve as the first record comprises: adding the first record to a tail of the associated data queue.

7. The method according to claim 1, wherein the first group of data comprises first data of a first cache type and fourth data of a second cache type, and the first cache type is different from the second cache type.

8. An electronic device, comprising:
    at least one processor; and
    at least one memory storing computer program instructions, wherein the at least one memory and the computer program instructions are configured to cause, together with the at least one processor, the electronic device to perform actions comprising:
    determining, in response to a first write operation on a first data block on a persistent storage device, whether a first group of data corresponding to the first data block is in a cache;
    updating the first group of data in the cache if it is determined that the first group of data is in the cache;
    adding the first group of data to an associated data set of the cache to serve as a first record;
    removing a second record in the associated data set in response to insufficient cache space in the associated data set, wherein the second record is the earliest added data record in the associated data set;
    adding each piece of data comprised in the second record to the non-associated data set of the cache; and
    dividing data in the second record into at least one data group based on address indexes of the pieces of data in the second record in the cache, wherein address indexes of the data belonging to the same data group are close to each other;

wherein removing the second record comprises: removing data in the second record that belong to the same data group from the second record in the same removal operation; and wherein adding each piece of data comprised in the second record to the non-associated data set comprises: adding data in the second record that belong to the same data group to the non-associated data set in the same adding operation.

9. The electronic device according to claim 8, wherein the actions further comprise:

determining whether first data in the first group of data is comprised in existing data in the associated data set, wherein the existing data is updated in the cache in response to a second write operation on a second data block on the persistent storage device, and the second write operation occurs before the first write operation; and removing the first data from the existing data if it is determined that the first data is comprised in the existing data.

10. The electronic device according to claim 8, wherein the actions further comprise:

adding the first group of data to a non-associated data set in the cache if it is determined that the first group of data is not comprised in the cache, wherein data in the non-associated data set does not overlap with data in each data record in the associated data set.

11. The electronic device according to claim 10, wherein the actions further comprise:

determining whether first data in the first group of data is comprised in the non-associated data set; and if it is determined that the first data is comprised in the non-associated data set:

removing the first data from the non-associated data set.

12. The electronic device according to claim 8, wherein removing the second record further comprises:

removing the second record if it is determined that the number of accesses to each piece of data in the second record in a recent period of time does not exceed a threshold number.

13. The electronic device according to claim 8, wherein the associated data set is an associated data queue, and wherein adding the first group of data to the associated data set to serve as the first record comprises: adding the first record to a tail of the associated data queue.

14. The electronic device according to claim 8, wherein the first group of data comprises first data of a first cache type and fourth data of a second cache type, and the first cache type is different from the second cache type.

15. A computer program product having a non-transitory computer readable medium which stores a set of instructions to manage a storage system; the set of instructions, when carried out by computerized circuitry, causing the computerized circuitry to perform a method of:

determining, in response to a first write operation on a first data block on a persistent storage device, whether a first group of data corresponding to the first data block is in a cache;

updating the first group of data in the cache if it is determined that the first group of data is in the cache; and adding the first group of data to an associated data set of the cache to serve as a first record;

removing a second record in the associated data set in response to insufficient cache space in the associated data set, wherein the second record is the earliest added data record in the associated data set; and adding each piece of data comprised in the second record to the non-associated data set of the cache; and dividing data in the second record into at least one data group based on address indexes of the pieces of data in the second record in the cache, wherein address indexes of the data belonging to the same data group are close to each other, wherein removing the second record comprises: removing data in the second record that belong to the same data group from the second record in the same removal operation; and wherein adding each piece of data comprised in the second record to the non-associated data set comprises: adding data in the second record that belong to the same data group to the non-associated data set in the same adding operation.

16. The computer program product according to claim 15, wherein the method further comprises:

determining whether first data in the first group of data is comprised in existing data in the associated data set, wherein the existing data is updated in the cache in response to a second write operation on a second data block on the persistent storage device, and the second write operation occurs before the first write operation; and removing the first data from the existing data if it is determined that the first data is comprised in the existing data.

17. The computer program product according to claim 15, wherein the method further comprises:

adding the first group of data to a non-associated data set in the cache if it is determined that the first group of data is not comprised in the cache, wherein data in the non-associated data set does not overlap with data in each record in the associated data set.

18. The computer program product according to claim 17, wherein the method further comprises:

determining whether first data in the first group of data is comprised in the non-associated data set; and if it is determined that the first data is comprised in the non-associated data set:

removing the first data from the non-associated data set.

19. The computer program product according to claim 15, wherein the associated data set is an associated data queue, and wherein adding the first group of data to the associated data set to serve as the first record comprises: adding the first record to a tail of the associated data queue.

20. The computer program product according to claim 15, wherein the first group of data comprises first data of a first cache type and fourth data of a second cache type, and the first cache type is different from the second cache type.

\* \* \* \* \*